(12) United States Patent
De Kock et al.

(10) Patent No.: US 7,494,529 B2
(45) Date of Patent: Feb. 24, 2009

(54) OPTIMIZATION OF BIOLEACHING PROCESS

(75) Inventors: Sanette H. De Kock, Randburg (ZA); Paul Barnard, Randburg (ZA); Clint Bowker, Randburg (ZA); Hannes Strauss, Randburg (ZA); Craig Van Buuren, Randburg (ZA); John Batty, Randburg (ZA); Chris Andre Du Plessis, Randburg (ZA)

(73) Assignee: BHP Billiton SA Limited, Randburg (ZA)

( * ) Notice: Subject to any disclaimer, the term of this patent is extended or adjusted under 35 U.S.C. 154(b) by 0 days.

(21) Appl. No.: 11/623,162

(22) Filed: Jan. 15, 2007

(65) Prior Publication Data

US 2007/0169587 A1 Jul. 26, 2007

Related U.S. Application Data

(63) Continuation of application No. PCT/ZA2005/000103, filed on Jul. 8, 2005.

(30) Foreign Application Priority Data

Jul. 16, 2004 (ZA) ................................. 2004/5221

(51) Int. Cl.
 *C22B 3/18* (2006.01)
(52) U.S. Cl. ....................................................... 75/743
(58) Field of Classification Search ................... 75/743, 75/744
 See application file for complete search history.

(56) References Cited

U.S. PATENT DOCUMENTS

| | | | |
|---|---|---|---|
| 5,278,069 A | | 1/1994 | Fass et al. |
| 5,413,624 A | * | 5/1995 | Rusin et al. .................... 75/711 |
| 6,110,253 A | * | 8/2000 | Kohr et al. ..................... 75/712 |
| 6,245,125 B1 | * | 6/2001 | Dew et al. ...................... 75/743 |
| 6,294,362 B1 | | 9/2001 | Sharp et al. |
| 6,884,280 B2 | * | 4/2005 | Batty et al. .................... 75/712 |
| 2001/0002312 A1 | * | 5/2001 | Sharp et al. ................. 435/170 |
| 2003/0089201 A1 | * | 5/2003 | Harlamovs et al. ............ 75/722 |
| 2004/0226408 A1 | * | 11/2004 | Du Plessis .................... 75/721 |
| 2005/0211019 A1 | | 9/2005 | Crundwell et al. |

FOREIGN PATENT DOCUMENTS

WO WO 2004/027099 A1 4/2004

(Continued)

OTHER PUBLICATIONS raffinate. (n.d.). The American Heritage® Science Dictionary. Retrieved Feb. 13, 2008, from Dictionary.com website: http://dictionary.reference.com/browse/raffinate. Copyright 2002.*

(Continued)

*Primary Examiner*—Roy King
*Assistant Examiner*—Tima M McGuthry-Banks
(74) *Attorney, Agent, or Firm*—Brinks, Hofer, Gilson & Lione; G. Peter Nichols

(57) ABSTRACT

A method for optimizing a bioleaching process, at least in respect of heat generation and primary copper sulphide leaching, by actively monitoring and controlling inorganic and organic compounds in a raffinate solution, produced in the process, to levels below that which could be inhibitory to microbial activity of bioleaching strains used in the process.

6 Claims, 2 Drawing Sheets

FOREIGN PATENT DOCUMENTS

WO    WO 2004027099 A1 *   4/2004

OTHER PUBLICATIONS

Brierley, C.L. "Bacterial succession in bioheap leaching", *Hydrometallurgy*, vol. 59, pp. 249-255, 2001.

International Search Report, No. PCT/IB03/04103, dated Jan. 12, 2004, 3 pgs.

Lizama, Hector M. "Copper bioleaching behaviour in an aerated heap", *Int. J. Miner. Process*, vol. 62, pp. 257-269, 2001.

* cited by examiner

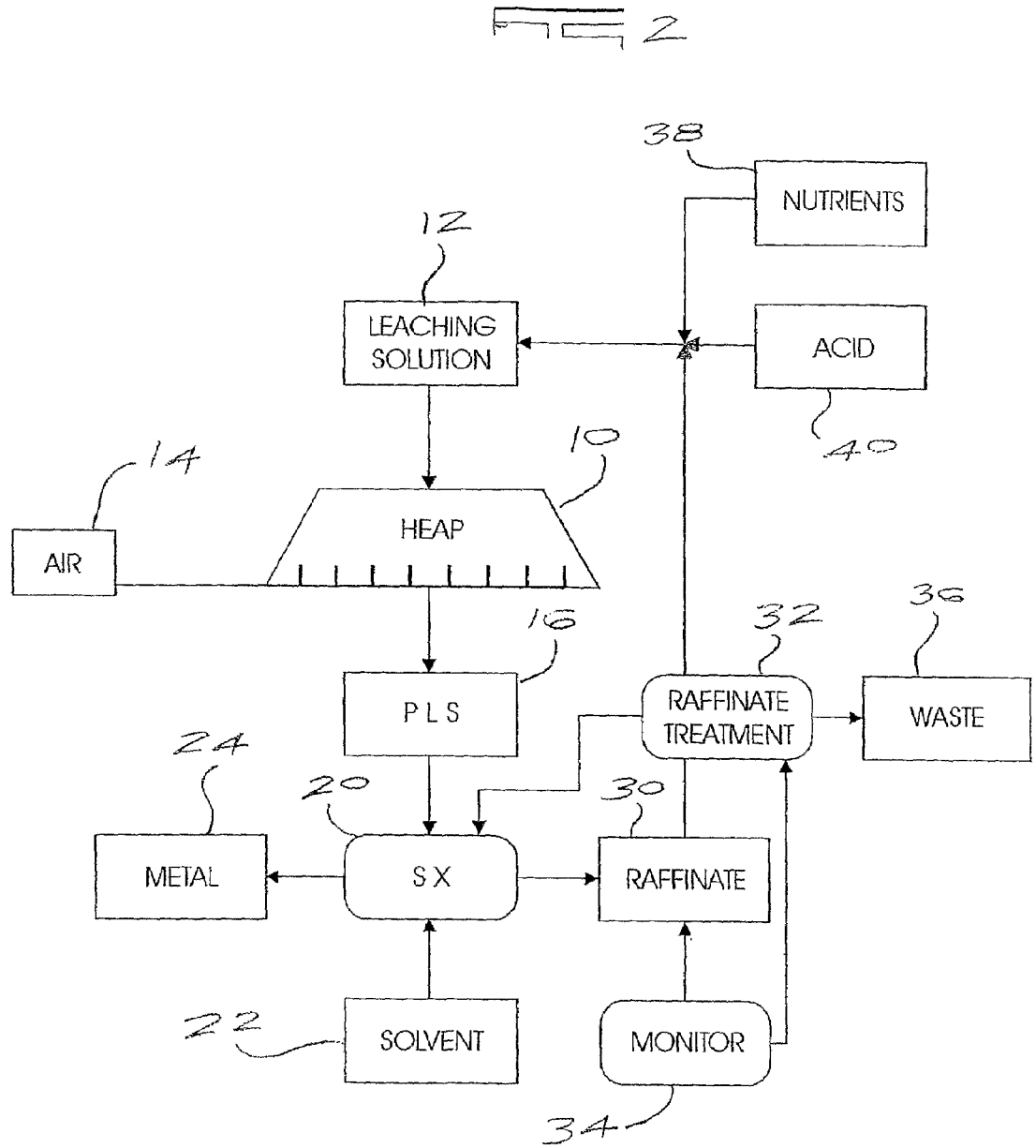

OPTIMIZATION OF BIOLEACHING PROCESS

This application is a continuation of and claims priority to PCT application PCT/ZA2005/000103 filed Jul. 8, 2005 published in English on Jan. 26, 2006 as WO 2006/010169 and to South African application No. 2004/5221 filed Jul. 16, 2004, the entire contents of each are incorporated herein by reference.

FIELD OF THE INVENTION

This invention relates to optimization of a bioleaching process for the recovery of one or more metals from ore containing the metal or metals. The invention is described hereinafter with particular reference to the bioleaching of low grade ore containing copper sulphide minerals. It is to be understood however that copper heap leaching is given only by way of example and that principles of the invention, modified where necessary, can be used for heap leaching to recover other metals such as gold, zinc, cobalt and nickel.

Also, although the invention is described with particular reference to a heap biobleach process, it is to be understood that certain principles are applicable to a tank bioleaching operation.

BACKGROUND OF THE INVENTION

In a typical heap bioleaching process low grade ore containing copper sulphide minerals, usually below 0.5% total copper, is subjected to biological treatment in which agglomerated or un-agglomerated ore is piled onto an impermeable base and then supplied with an efficient leach liquor distribution and collection system.

An acidic leaching solution is percolated through the ore. Microbes growing in the heap produce ferric iron and acid that result in mineral dissolution and mineral solubilization. Aeration in this type of process may be passive, with air being drawn into the heap as a result of the flow of liquid, or active, with air being blown into the heap through piping installed in a lower region of the heap.

A metal-containing leach solution (known as a pregnant liquor solution or PLS) that drains from the heap is collected and subjected to a metal recovery process which typically includes a solvent extraction step. During this step one or more metals contained in the leach solution are transferred into an organic phase of a solvent which has a high affinity for the target metal or metals.

The leaching solution from which the metal has been stripped by the solvent extraction process is referred to as raffinate and is returned to the heap irrigation system, optionally with the addition of acid and nutrients, and is again allowed to percolate through the heap.

For successful heap leaching of sulphide copper minerals microbial activity is required in order to catalyse oxidation of reduced sulphur and iron species. Reference should be made in this regard to FIG. 1 of the accompanying drawings which schematically depicts processes in the bioleaching of primary copper sulphide minerals such as chalcopyrite ($CuFeS_2$) and secondary copper sulphide minerals such as covellite ($Cu_2S$) and chalcocite (CuS). It is to be noted that the bioleaching of primary copper sulphides is normally significantly slower due to the more refractory nature of such minerals. Consequently copper recovery from primary copper sulphide minerals is usually less effective than copper recovery from secondary sulphides for the latter process can often be accomplished in sub-optimal conditions in which microbial catalytic bioleaching activity is inhibited.

In the case of secondary sulphide minerals the microbial oxidation of ferrous iron to ferric iron, at a rate that exceeds the consumption rate of ferrous iron during leaching, without significant sulphur oxidation, is often sufficient to result in significant copper recovery even at ambient temperatures. Ferrous oxidation rates occur rapidly relatively to reduced sulphur oxidation for a number of reasons that include the following: (a) a lower electron yield per mole of ferrous iron than per mole of reduced sulphur; and (b) a greater solubility and mobility of ferrous iron in the ore, compared to corresponding figures for the reduced sulphur species.

The rate of chalcopyrite leaching can be increased if leaching is carried out at an elevated temperature in the range from 40° C. to 65° C. By oxidising reduced sulphur species such as pyrite ($FeS_2$) heat is generated and the temperature of the ore is raised. In order to oxidise reduced sulphur, conditions have to be significantly more favourable and optimised for microbial growth than is the case when only ferrous oxidation is required.

Sub-optimal growth conditions are attributable to at least the following:

1. incorrect pH conditions;
2. a lack of critical macro- and micro-nutrients;
3. a high ionic strength or total salt content of the percolating leaching solution which, as noted, is usually a raffinate solution;
4. the presence of dissolved or entrained organic compounds with inhibitory effects towards microbial growth; and
5. carbon- or oxygen-limiting conditions.

Total salt content is a measure of the presence of mainly sulphide salts with associated aluminium, magnesium, sodium, calcium and potassium cations or, more generally, any soluble anion or cation, of the percolating leaching solution. When the total salt content is excess of about 80 g/L to 120 g/L microbial activity is inhibited to an increasing extent. Microbial inhibition may however occur at lower levels of total salt content in the presence of particular cations and anions which cause specific inhibition (rather than non-specific ionic strength and osmotic potential inhibition), such as chlorides, nitrates, aluminium, fluoride and arsenic.

In a heap leaching system the target pH of the pregnant liquor solution is typically in the range 1.5 to 2.2. Acid is used principally to dissolve acid-soluble copper and to maintain such copper in solution, and to create an environment conducive to microbial growth and activity. The gangue minerals, however, are often acid-consuming and can react with the acid contained in the solution which is percolated through the heap. This reaction results in the release of salts, typically sulphate salts with associated aluminium, potassium and magnesium cations, that are carried as dissolved species in the solution. The concentration of such dissolved salts increases over time as the heap leaching process progresses and due to the concentrating effect of evaporation.

The increase in organic salts, in the aforementioned manner, results in increasing levels of inhibition of microbial activity. This can be a non-specific inhibition as is caused by high ionic strength (high osmotic potential) which results in reduced water activity which, in turn, results in lowered microbial activity. Alternatively or additionally the inhibition may be caused by specific inorganic compounds such as nitrate, chloride, aluminium, fluoride and arsenic. A common type of microbial inhibition (or sub-optimal microbial activity) encountered in a heap leaching operation is due to high total salt content which results in lowered water activity and non-specific microbial inhibition.

Organic compounds can exhibit a similar inhibitory effect on microbial activity. As has been described the metal which is contained in the pregnant liquor solution is stripped from the solution during a solvent extraction process. Although the solvent is substantially water-insoluble a small fraction of the solvent is indeed soluble and may end up in the water phase. This may be either as water-soluble fractions or as discrete droplets (micelles). The organic compounds, in either form, are then taken up in the raffinate and eventually are percolated through the heap. Some of the organic solvent compounds are inhibitory to bioleaching microorganisms and the introduction thereof into the heap can result in reduced or sub-optimal microbial activity. The organic compounds may be a primary cause of microbial inhibition or may contribute to inhibition effects due to inorganic salts. As the organic compounds are essentially hydrophobic, these compounds will tend to adsorb onto the ore material during migration in the percolating irrigation liquid. Such adsorption effects will have a more detrimental effect on sulphur oxidation than on ferrous iron oxidation. The reason for this phenomena is mainly due to the fact that reduced sulphur compounds are insoluble. Microbial oxidation of such compounds, therefore, have to occur at the mineral surface, and would thus be more negatively affected by surface-adsorbed inhibitory compounds. By comparison, ferrous iron is water-soluble and can readily be oxidized by non-attached microbial cells and is thus less affected by the presence of surface-adsorbed organic compounds.

An elevated temperature is not required for a sulphide heap leaching operation which mainly contains secondary sulphide copper minerals. The oxidation of reduced sulphur, which generates the heat used to elevate the temperature of a heap, is therefore not a strict requirement for the leaching of secondary copper minerals and satisfactory mineral leaching rates can be achieved in the presence of ferrous iron oxidation without significant sulphur oxidation. Since ferrous iron oxidation rates are less affected by sub-optimal microbial conditions than sulphur oxidation conditions the impact of a high salt content or of the presence of organic compounds on the leaching rate of secondary sulphide minerals is relatively unimportant.

Sub-optimal conditions associated with inorganic salts or organic compounds do however have a significant adverse effect on sulphur oxidation which manifests itself in a pronounced way in respect of the mineral dissolution rate of primary sulphide minerals, such as chalcopyrite, where heat generation is a critical factor in achieving a satisfactory leaching rate. Primary copper sulphide and pyrite mineral dissolution rates are negatively affected and the copper leaching rate from primary copper sulphide minerals is reduced.

SUMMARY OF THE INVENTION

The invention provides a method for optimizing a bioleaching process, at least in respect of heat generation and primary copper sulphide leaching, by actively monitoring and controlling inorganic and organic compounds in a raffinate solution, produced in the process, to levels below that which could be inhibitory to microbial activity of bioleaching strains used in the process.

The bioleaching process may be carried out in a reactor, eg. in one or more tanks, or in a heap.

The total salt content in the raffinate solution may be reduced in any suitable way and preferably is reduced by dilution, precipitation or reverse osmosis, or a combination of these techniques.

The invention further extends to the step of controlling the metal recovery phase to reduce the organic compound content in the raffinate. If solvent extraction techniques are employed then, for example, use may be made of non-inhibitory solvent extraction organic compounds. Alternatively or additionally it is possible to remove dissolved organic carbon compounds from the raffinate solution in any appropriate way, for example by using oxidation or absorption techniques.

The invention may explicitly include the steps of monitoring the organic content of the raffinate and of controlling the organic content in response to the monitoring step.

Figure 1:
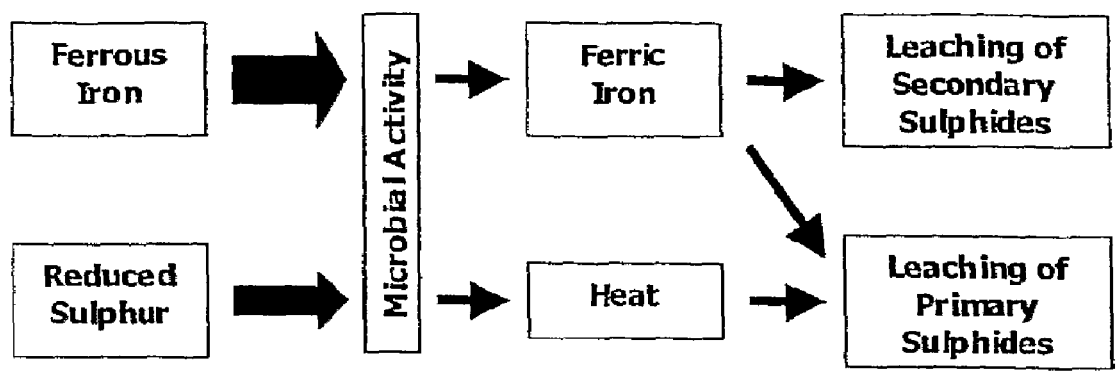
FIG. 1 schematically illustrates processes in the bioleaching of primary copper sulphide minerals and secondary copper sulphide minerals.

The invention is further described by way of example with reference to FIG. 2 of the accompanying drawings.

DETAILED DESCRIPTION OF THE EMBODIMENTS

FIG. 2 of the accompanying drawings illustrates a heap 10 of crushed ore which contains primary and secondary sulphide copper minerals. The heap is constructed in a known way on an impermeable base and is supplied with an acidic leaching solution from a source 12 and with air by an aeration system 14. These aspects are not further described herein.

Pregnant liquor solution 16, which drains from the heap, is subjected to a solvent extraction process 20 using an organic solvent 22 chosen on the basis of a target metal 24 which is to be stripped from the solution 16.

The process 20 produces the target metal 24 and a raffinate solution 30.

The raffinate 30, due to the fact that it is generally recycled through the heap 10 and as a result of the concentrating effect of evaporation, can have a high total salt content and, moreover, can be contaminated by organic compounds released from the solvent 22.

The raffinate 30 is treated in a step 32 to reduce the level of those compounds which inhibit microbial activity. The treatment step can be carried out routinely or in response to a measurement, obtained in a monitoring step 34, of the total salt content of the raffinate or of the organic compound content in the raffinate.

The monitoring step is adopted to obtain a measurement of the level of inorganic salts and organic compounds which can have an adverse effect on microbial activity. The monitoring step can be carried out in different ways including: (a) a microscopic detection of cell concentrations in the pregnant liquor solution; (b) bio-assays to monitor the growth rate of sulphur and/or iron oxidation rates of bioleaching microbes; and (c) respirometry techniques to detect the rates of oxygen and/or carbon dioxide consumption as an indicator of microbial activity.

The manner in which the raffinate is treated in the step 32 may vary according to requirement. Typically the total salt content of the raffinate is reduced by dilution, precipitation, reverse osmosis or any other appropriate technique. The organic compound content in the raffinate can be reduced by improved physical solvent extraction operation conditions and phase separation, by the use of non-inhibitory solvent extraction organic compounds in the solvent extraction phase 20, or by the removal of dissolved organic compounds from the solution using suitable oxidation or absorption methods. It is critical to note that routine operational management of heap leaching operations typically involve steps to prevent excessive build-up of total salts in the raffinate as well as losses of solvent extraction organic chemicals to the raffinate. Such steps are however taken for operational reasons that relate to the high cost of solvent inventory as well as the impact high salt concentrations in solution have on the physical-chemical and electrochemical aspects of the down-stream processing of the dissolved metal, rather than for microbial activities reasons as they pertain to the actual heap. Also important to note is that the monitoring and control that are required to prevent detrimental impacts on microbial growth in the heap, are significantly more stringent than that which would be required for other operational reasons. For example, organic solvent concentration as low as <5 mg/L would be lethal to microbial activity whereas such losses would be well within range when managed from a solvent extraction chemical inventory loss point of view.

Waste material 36 produced in the raffinate treatment step 32 is disposed of as necessary. The resulting solution, optionally with the addition of nutrients 38 and acid 40, is then directed to the leaching distribution network for the heap.

By treating the raffinate in the manner described it is possible to overcome or reduce the inhibiting affects which otherwise would be displayed by the inorganic salts and organic compounds. The oxidation of reduced sulphur species is promoted and this results in elevated temperatures which increase the effectiveness of primary copper sulphide mineral leaching.

The invention has been described with reference to a heap leaching process but it is to be understood that a similar benefit could be obtained by the treatment of raffinate from a solvent extraction plant reporting to a tank bioleaching reactor or reactors.

Since modifications within the spirit and scope of the invention may readily be effected by persons skilled within the art, it is to be understood that this invention is not limited to the particular embodiment described by way of example hereinabove.

The invention claimed is:

1. A method for optimizing a bioleaching process comprising forming a pregnant liquor solution, subjecting the pregnant liquor solution to a metal recovery phase; monitoring organic compounds released from an organic solvent used in the metal recovery phase, in a raffinate solution by carrying out one of the following: (a) a microscopic detection of cell concentrations in the pregnant liquor solution, (b) a bioassay to monitor the growth rate of at least one of sulphur and iron oxidation rate of bioleaching microbes, and (c) a respirometry technique to detect at least one of a rate of oxygen and carbon dioxide consumption as an indicator of microbial activity; and controlling the metal recovery phase in response to the monitoring to reduce the organic compound content in the raffinate to levels below that which could be inhibitory to microbial activity of bioleaching microbes used in the process.

2. A method according to claim 1 wherein the bioleaching process is carried out in a reactor.

3. A method according to claim 1 wherein the bioleaching process is carried out in a heap.

4. A method according to claim 1 wherein a total salt concentration in the raffinate solution is reduced by dilution, precipitation or reverse osmosis, or a combination of these techniques.

5. A method according to claim 1 wherein solvent extraction techniques are employed in the metal recovery phase and the organic compound content is reduced using non-inhibitory solvent extraction organic compounds.

6. A method according to claim 1 wherein dissolved organic compounds are removed from the raffinate solution using oxidation or absorption techniques.

* * * * *